(12) United States Patent
Hirai et al.

(10) Patent No.: US 8,799,939 B2
(45) Date of Patent: Aug. 5, 2014

(54) VIDEO RECEIVING APPARATUS AND VIDEO RECEIVING METHOD

(75) Inventors: Koji Hirai, Tokyo (JP); Hiroyuki Kobayashi, Osaka (JP)

(73) Assignee: Sony Corporation, Tokyo (JP)

( * ) Notice: Subject to any disclaimer, the term of this patent is extended or adjusted under 35 U.S.C. 154(b) by 1630 days.

(21) Appl. No.: 11/893,600

(22) Filed: Aug. 14, 2007

(65) Prior Publication Data

US 2008/0129883 A1     Jun. 5, 2008

(30) Foreign Application Priority Data

Aug. 21, 2006   (JP) ............................. P2006-224776

(51) Int. Cl.
| | |
|---|---|
| *H04N 7/16* | (2011.01) |
| *H04N 17/00* | (2006.01) |
| *H04N 11/00* | (2006.01) |
| *H04N 5/44* | (2011.01) |
| *H04N 17/02* | (2006.01) |
| *H04N 21/436* | (2011.01) |
| *H04N 21/4363* | (2011.01) |

(52) U.S. Cl.
CPC ....... *H04N 21/436* (2013.01); *H04N 21/43635* (2013.01); *H04N 21/43632* (2013.01)
USPC ............. 725/25; 348/180; 348/552; 348/553; 348/554

(58) Field of Classification Search
CPC .......... H04N 21/436; H04N 21/43632; H04N 21/43635
See application file for complete search history.

(56) References Cited

U.S. PATENT DOCUMENTS

| | | | |
|---|---|---|---|
| 6,353,460 B1 * | 3/2002 | Sokawa et al. ................ 348/555 |
| 2006/0208929 A1 * | 9/2006 | Cho ................................ 341/50 |
| 2007/0036158 A1 * | 2/2007 | Hun-Kwon et al. .......... 370/389 |

FOREIGN PATENT DOCUMENTS

| | | |
|---|---|---|
| JP | 61-030845 | 2/1986 |
| JP | 2001-251476 A | 9/2001 |
| JP | 2002-320168 A | 10/2002 |
| JP | 2004-147119 A | 5/2004 |
| JP | 2004-187121 A | 7/2004 |
| JP | 2006-019809 A | 1/2006 |
| WO | WO-02/078336 A1 | 10/2002 |

* cited by examiner

*Primary Examiner* — Nathan Flynn
*Assistant Examiner* — James R Marandi
(74) *Attorney, Agent, or Firm* — Sony Corporation

(57) ABSTRACT

A video receiving apparatus is provided. The video receiving apparatus may have a video input terminal to input video data, and may include a voltage detector configured to detect a voltage applied to a specific contact point in the video input terminal; and a control unit configured to determine whether a video transmission apparatus is connected to the video input terminal through a predetermined cable, based on a value of the voltage detected by the voltage detector.

7 Claims, 5 Drawing Sheets

VIDEO RECEIVING APPARATUS AND VIDEO RECEIVING METHOD

CROSS-REFERENCE TO RELATED APPLICATIONS

This application claims priority from Japanese Patent Application No. JP 2006-224776 filed in the Japanese Patent Office on Aug. 21, 2006, the entire content of which is incorporated herein by reference.

BACKGROUND OF THE INVENTION

1. Field of the Invention

The present invention relates to a video receiving apparatus and a video receiving method, which are suitable for being applied to a digital video/audio I/O interface standard referred to as the HDMI (High-Definition Multimedia Interface) standard.

2. Description of the Related Art

Lately, the HDMI standard has been developed as an interface standard to transmit uncompressed digital video data and the like between a plurality of video apparatuses. According to the HDMI standard, video data is transmitted as individual primary color data respectively transmitted based on a pixel. In the HDMI standard, audio data is also transmitted using a transmission line for video data in a blanking period of the video data. Red, green and blue (R-data, G-data, and B-data) of additive primary color data on three channels are transmitted. Alternatively, luminance and color-difference signals such as Y, Cb and Cr may be transmitted.

Data of respective colors basically includes eight bits in one pixel. Synchronization signals such as a horizontal synchronization signal and a vertical synchronization signal are also transmitted at a timing that each synchronization signal is arranged. A transmission line for pixel clock of video data and a transmission line for control data are also provided.

One device may include a plurality of such HDMI standard terminals. Particularly, a device to receive video data, for example, a television receiver may include a plurality of HDMI standard terminals so that two or more video transmission devices can be connected. In addition, a television receiver may include various input terminals of other standards such as an analogue composite video input terminal that has been available and a video input terminal referred to as a D terminal.

WO2002/078336 discloses details of the HDMI standard.

SUMMARY OF THE INVENTION

In the case where a video device such as a television receiver includes various kinds of video input terminals such as an HDMI standard terminal, there may be such a problem that a video input switching operation is complicated. Particularly, if there are input terminals not being used in a television receiver, it has been practiced in the past that the terminal not being used is skipped when the input switching operation is performed. The terminal to be skipped is preset by user setting using a menu screen, for example, so that a specific terminal is skipped, or a video signal input to each terminal is detected so that a terminal having the input video signal alone is selected.

Here, in the case where such practice of skipping a terminal not being used is applied to the above-described input terminal of the HDMI standard, it is difficult to know whether there is video input to the HDMI standard terminal. In order to determine whether a video signal is input to the input terminal of the HDMI standard, an input signal is actually decoded in a decoder that is formed of an integrated circuit connected to the input terminal of the HDMI standard so that input format information is checked. Accordingly, there has been such a problem that a scale of the circuit necessary for the input determination is large, since it may be necessary to operate the decoder connected to the input terminal of the HDMI standard.

Also, in the case where a plurality of input terminals of the HDMI standard are provided, there is such a problem that one decoder may not be shared with all the input terminals and a decoder may need to be provided for each input terminal to detect the input to the input terminal.

It is desirable to easily detect an input of video data to an input terminal in the case of providing a video data input terminal such as an HDMI standard terminal.

According to an embodiment of the present invention, in the case where video data is received by a device that includes a video input terminal to input the video data, a voltage applied to a specific contact point in the video input terminal may be detected. Based on a detected voltage value, it may be determined whether there is a video transmission apparatus connected to the video input terminal through a predetermined cable.

Since the connection may be determined in this manner, a video transmission apparatus may be configured to have a contact point that is connected to the above-described specific contact point and is grounded. As a result, whether the video transmission apparatus is connected to the video input terminal may be determined by detecting whether there is the connection to the ground potential in the voltage detection.

According to an embodiment of the present invention, whether there is a device on the other end of connection may easily be determined only by detecting a voltage of the specific contact point in the video input terminal. Accordingly, the connection between devices can easily be determined without decoding received video data, and input switching control can be performed favorably based on the above-described determination of the device connected.

DETAILED DESCRIPTION

Hereinafter, an embodiment of the present invention is explained by referring to the attached drawings.

Figure 1:
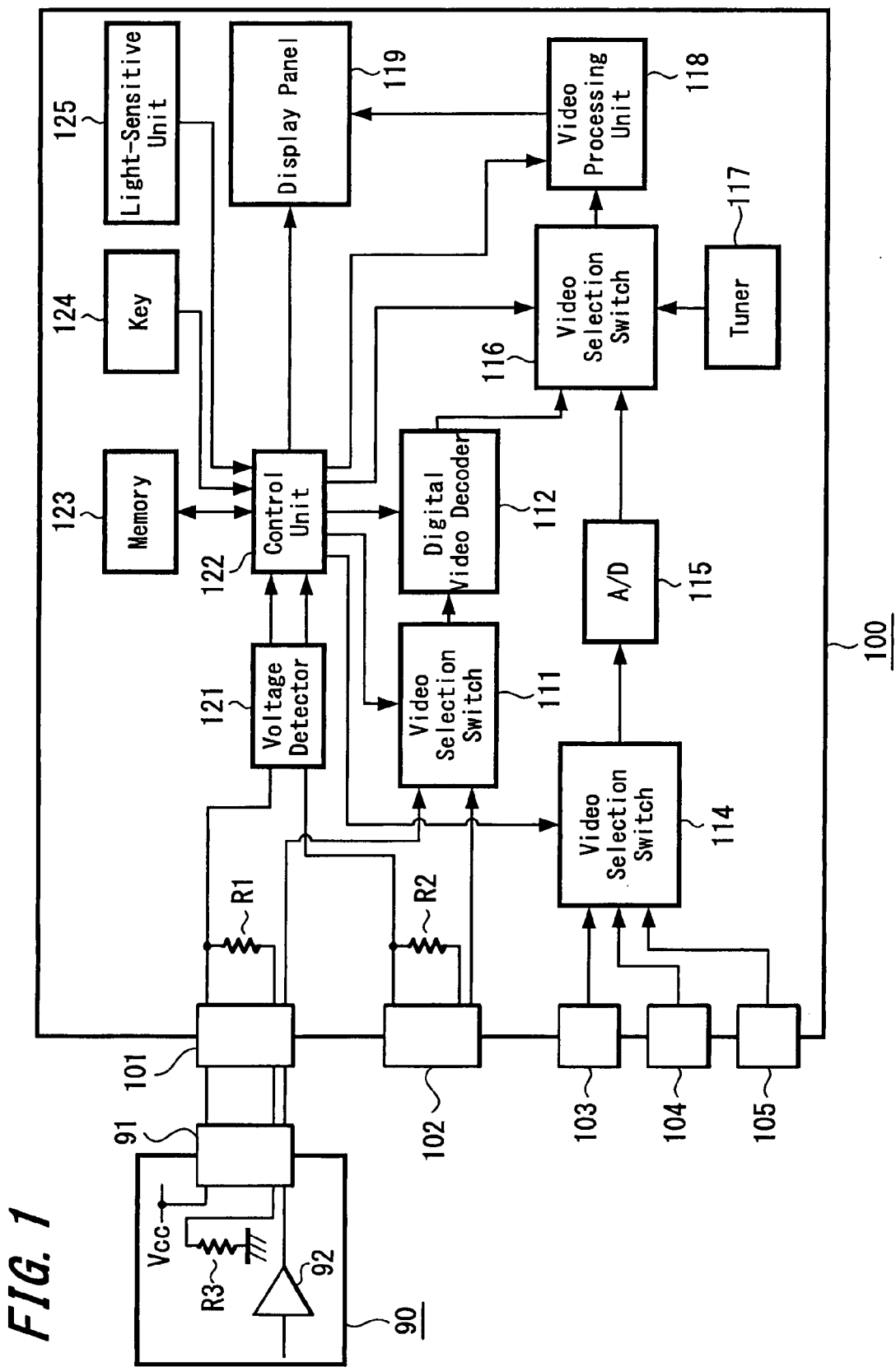
FIG. 1 is a block diagram showing an example of a system configuration according to an embodiment of the present invention.

According to the embodiment, a television receiver is used as a video device that includes an input terminal of the HDMI standard. FIG. 1 is a diagram showing the whole configuration of the television receiver.

A television receiver 100 shown in FIG. 1 includes a first HDMI terminal 101 and a second HDMI terminal 102 as the input terminals of the HDMI standard (hereinafter, referred to as an HDMI terminal), which are provided as a video input terminal. Those first and second HDMI terminals 101 and 102 are the input terminals to which digital video data is input. Details of a configuration of data input to the terminals are later described.

In the example shown in FIG. 1, an HDMI terminal 91 of a video output device 90 is connected to the first HDMI terminal 101 through a signal cable of the HDMI standard.

Further, the television receiver 100 includes analogue video input terminals 103, 104 and 105. Input terminals of various systems such as a composite video input terminal, S-video input terminal and D-video input terminal, for example, can be applied as those analogue video input terminals 103, 104 and 105.

The first HDMI terminal 101 and the second HDMI terminal 102 are configured to receive pixel-based video data for each primary color signal on an individual channel, and also, there is provided a channel for transmitting control data and the like. Further, a contact point to supply a predetermined DC voltage from a device receiving video data (here, the television receiver 100) to a device on the other end (for example, the video output device 90) is provided in each of the HDMI terminals 101 and 102.

As shown in FIG. 1, DC voltage Vcc of 5V applied to the video output device 90 is herein transmitted to the contact point of the first HDMI terminal 101 through the cable, and the contact point in the first HDMI terminal 101 where the above voltage is obtained is connected to one end of a resistor R1. Further, the other end of the resistor R1 is connected to another contact point of the first HDMI terminal 101 so that the supplied DC voltage is returned to the video output device 90 through the connected cable and is grounded through a resistor R3 in the video output device 90. Also, a resistor R2 is connected to the second HDMI terminal 102 with a similar connection configuration. Further, according to this embodiment, the voltage obtained at one end of the resistor R1 and the voltage obtained at one end of the resistor R2 are detected by a voltage detector 121. Here, each voltage of the contact points at the two HDMI terminals 101 and 102 is detected individually.

The contact point, which supplies the voltage, is connected to a ground potential portion included in a device on the other end only in the case where a data receiving device is connected to the device on the other end using the signal cable of the HDMI standard. Specifically, as shown in FIG. 1, for example, in the case of being connected to the HDMI terminal 91 of the video output device 90, the HDMI terminal 101 is connected the ground potential portion through the resistor R3 in the video output device 90. As shown in FIG. 1, the voltage Vcc is not supplied to one end of the resistor R2 of the second HDMI terminal 102 to which a device is not connected and not grounded. Therefore, different voltage values are detected for the two HDMI terminals 101 and 102 in the voltage detector 121 in the state shown in FIG. 1.

Data on the voltage value detected in the voltage detector 121 is supplied to a control unit 122. The control unit 122 is a central processing unit to control an operation of each unit in the television receiver 100. A memory 123 is connected to the control unit 122 and stores information necessary for the control. As information stored in the memory 123, there is information on devices connected to the HDMI terminals 101 and 102. In addition, an operation command from a key 124 is input to the control unit 122 and also an operation command based on a remote control signal (such as a infrared signal) received at a light-sensitive unit 125 is input to the control unit 122. As one of operation commands, there is a video input switching operation command based on a key operation (button operation) or an operation of a remote controller for giving the command on the input switching.

Video data input to the two HDMI terminals 101 and 102 are supplied to a video selection switch 111 in which one of the video data is selected by the control of the control unit 122. The selected video data is supplied to a digital video decoder 112 in which decoding processing is performed on the video data. The control unit 122 controls the decoding operation at the digital video decoder 112. In addition, auxiliary data and the like added to the video data are also decoded at the digital video decoder 112, and the decoded auxiliary data is supplied to the control unit 122. It should be noted that the control unit 122 terminates electric power supply to the digital video decoder 112 so that the decoding operation is not performed, in the case where it is determined that a device is not connected to any of the two HDMI terminal 101 and 102. The video data decoded at the digital video decoder 112 is supplied to a video selection switch 116.

Any one of analogue video signals obtained at the analogue video input terminals 103, 104 and 105 is selected at a video selection switch 114 by the control of the control unit 122. The selected video signal is converted into digital video data at an analogue/digital converter 115, and the converted video data is supplied to the video selection switch 116. In addition, video data received at a tuner 117 is also supplied to the video selection switch 116.

The video selection switch 116 selects video data from among an output from the digital video decoder 112, an output from the analogue/digital converter 115 and an output from the video data received at the tuner 117 by the control of the control unit 122. The selected video data is supplied to a video processing unit 118 in which the video data is processed to be displayed on a display panel 119. The control unit 122 controls all the selection operations performed at respective video selection switches 111, 114 and 116 comprehensively to select the input of video finally displayed on the display panel 119.

It should be noted that configuration for video processing alone is shown in FIG. 1, but processing of selecting audio data and outputting from a speaker and the like is also performed in synchronization with the selection of video.

Next, configuration of data transmitted between HDMI terminals of connected devices is explained.

Figure 2:
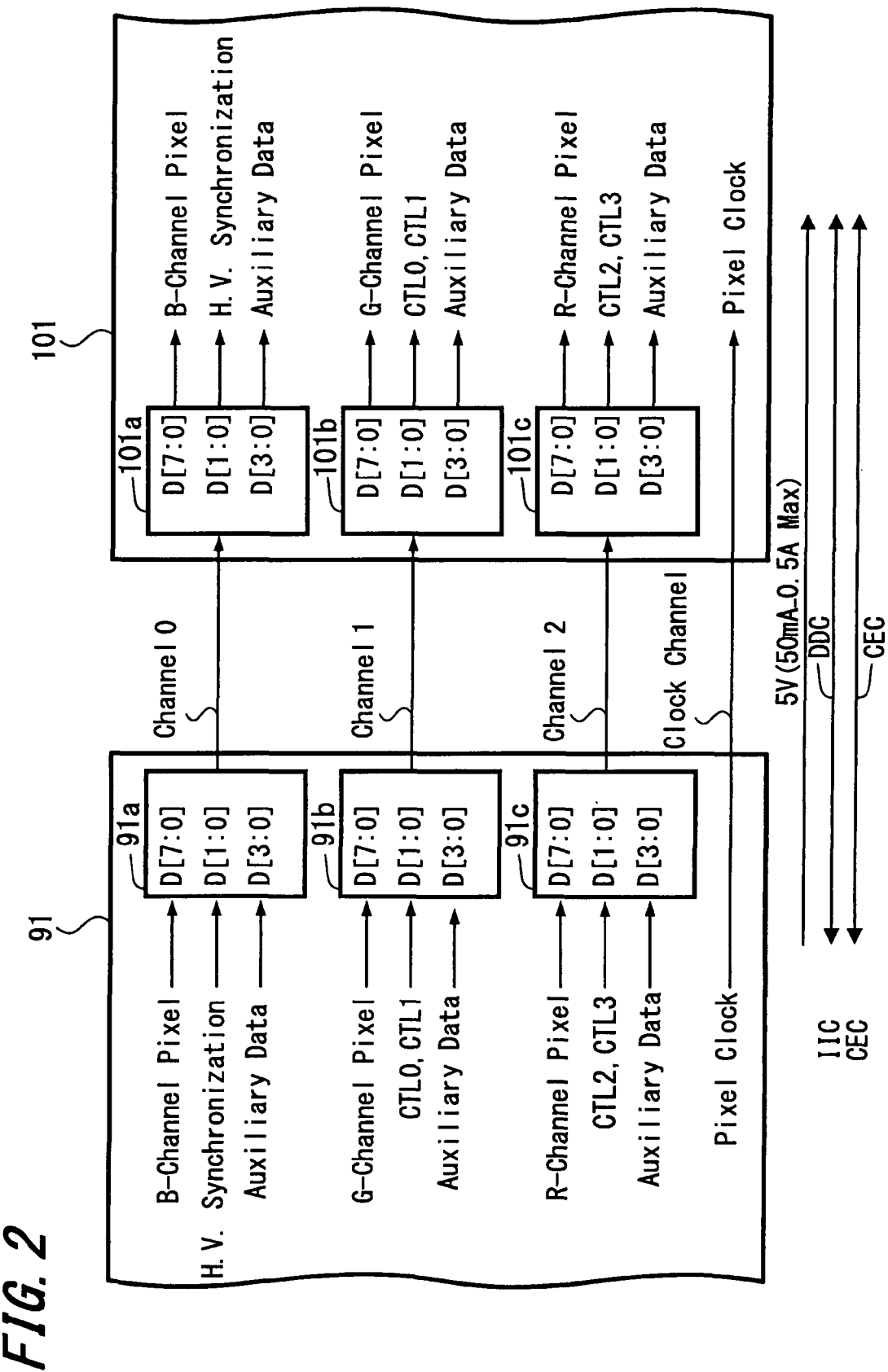
FIG. 2 is an explanatory diagram showing an example of a transmission channel configuration according to an embodiment of the present invention.

FIG. 2 is a diagram showing an example of data configuration on each channel transmitted using an HDMI cable between a transmission processing unit connected to the terminal 91 of the video output device 90 and a transmission processing unit connected to the terminal 101 of the television receiver 100 of the projector apparatus 30. As shown in FIG. 2, channel 0, channel 1 and channel 2 for transmitting video data are prepared, and further a clock channel to transmit pixel clock is prepared. In addition, a DDC (Display Data Channel) line and CEC (Consumer Electronics Control) line are prepared as control data transmission channels. Further, a signal line for transmitting DC voltage of 5V or less from a source device to a sink device are also provided. This line is a line to which the power supply voltage Vcc shown in FIG. 1 is applied according to this embodiment.

On the transmission side, transmission processing units (transmitting units) 91a, 91b and 91c connected to the terminal 91 are prepared for respective channels for transmitting video data, and on the receiving side, transmission processing units (data receiving units) 101a, 101b and 101c connected to the terminal 101 are also prepared for respective channels for transmitting video data.

A configuration of each channel is herein explained. The channel 0 is configured to transmit pixel data of B-data (blue data), vertical synchronization data, horizontal synchronization data and auxiliary data. The channel 1 is configured to transmit pixel data of G-data (green data), two kinds of control data (CTL0, CTL1) and auxiliary data. The channel 2 is configured to transmit pixel data of R-data (red data), two kinds of control data (CTL2, CTL3) and auxiliary data.

Figure 3:
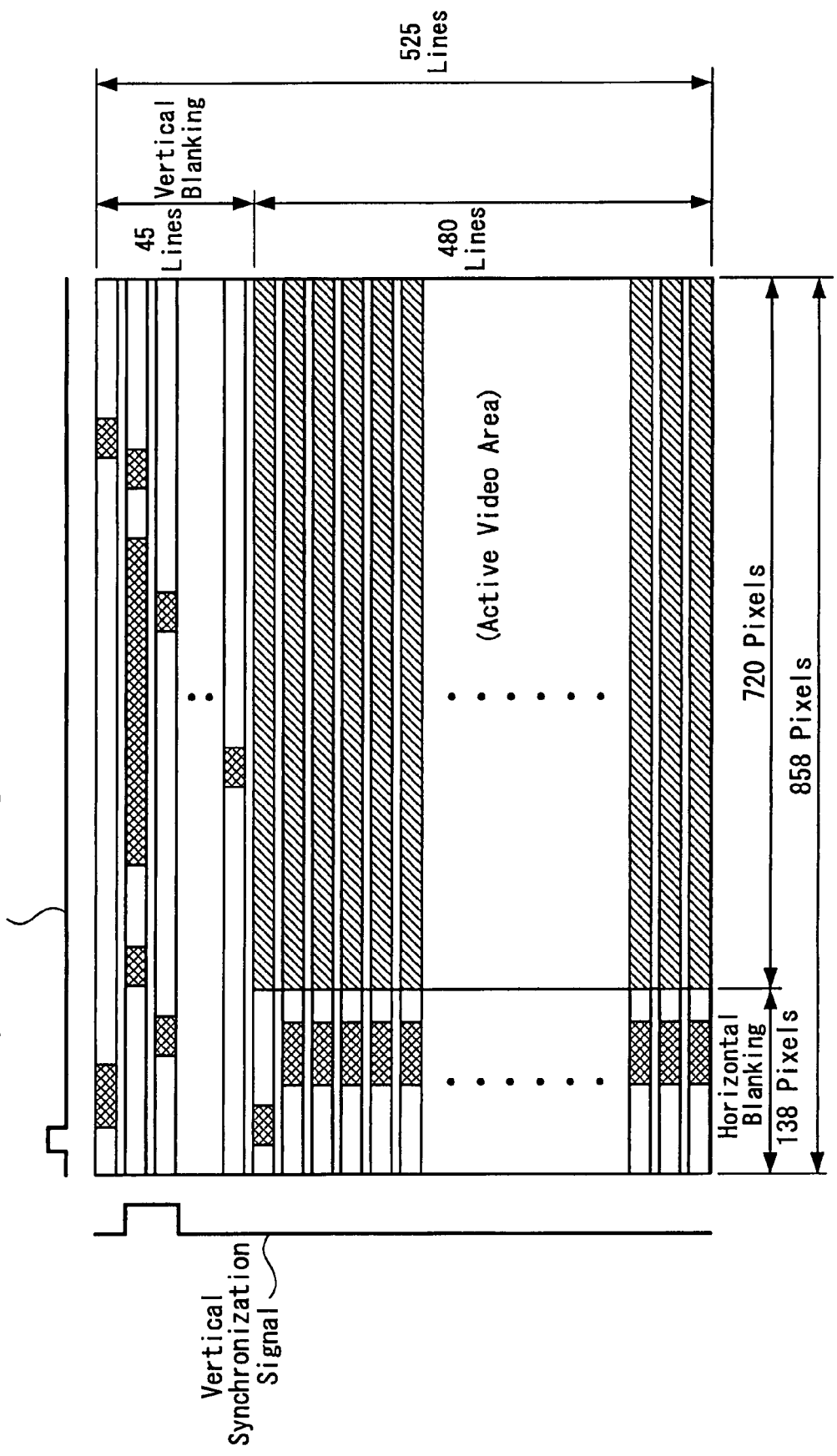
FIG. 3 is an explanatory diagram showing an example of a bit configuration according to an embodiment of the present invention.

FIG. 3 is a diagram showing a line configuration and a pixel configuration of one frame which is transmitted according to the embodiment. Video data (main video data) transmitted in this embodiment is uncompressed data to which a vertical blanking period and a horizontal blanking period are added. Specifically, FIG. 3 shows an example of pixel data of 480 lines×720 pixels set as a video area displayed (shown as an active video area), and 525 lines×858 pixels are set as the number of lines and pixels including the blanking periods, respectively. An area shown with double hatching (with left and right diagonal lines) in the blanking period is referred to as a data island to which the auxiliary data can be added.

The example shown in FIG. 3 includes 480 lines×720 pixels (more specifically, 480 pixels in the vertical direction and 720 pixels in the horizontal direction) in one frame, however data of other frame configuration having other number of pixels than the example can also be transmitted. In any of the cases, the vertical blanking period and the horizontal blanking period, to which auxiliary data is added, are added to the frame so that the auxiliary data is added to the blanking period.

Figure 4:
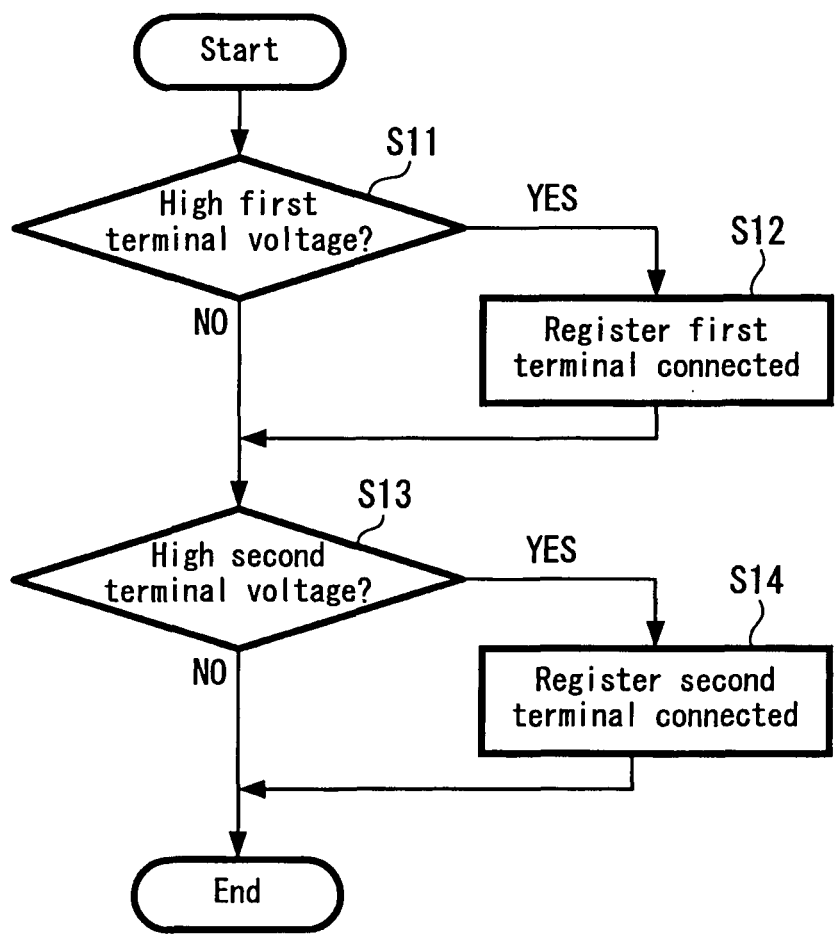
FIG. 4 is a flow chart indicating an example of connection detection processing according to an embodiment of the present invention.

Next, processing of determining a state of devices connected to the two HDMI terminals 101 and 102, performed by the control of the control unit 122 in the television receiver 100 according to the embodiment is explained referring to a flow chart shown in FIG. 4.

First, the control unit 122 determines whether the voltage value detected from the first HDMI terminal 101 at the voltage detector 121 is equal to or more than a predetermined threshold value (step S11). Here, in the case where the voltage value is determined to be equal to or more than the threshold value, it is determined that the video output device 90 is connected and grounded, and therefore, a device is connected, as shown in FIG. 1. As a result, it is registered in the memory 123 that there is the device connected to the first HDMI terminal 101 (step S12). In the case where the voltage value is determined to be less than the threshold value, it is determined that there is no device connected to the first HDMI terminal 101 and registration processing is not performed.

Next, the control unit 122 determines whether the voltage value detected from the second HDMI terminal 102 at the voltage detector 121 is equal to or more than a predetermined threshold value (step S13). Here, in the case where the voltage value is determined to be equal to or more than the threshold value, it is determined that a device is connected, and accordingly it is registered in the memory 123 that there is the device connected to the second HDMI terminal 102 (step S14). In the case where the voltage value is less than the threshold value, it is determined that there is no device connected to the second HDMI terminal 102 and the registration processing is not performed.

Information on the device connection is thus registered, and processing of skipping a terminal is performed using the registered information on the device connection, in the case where there is the video input switching operation.

Figure 5:
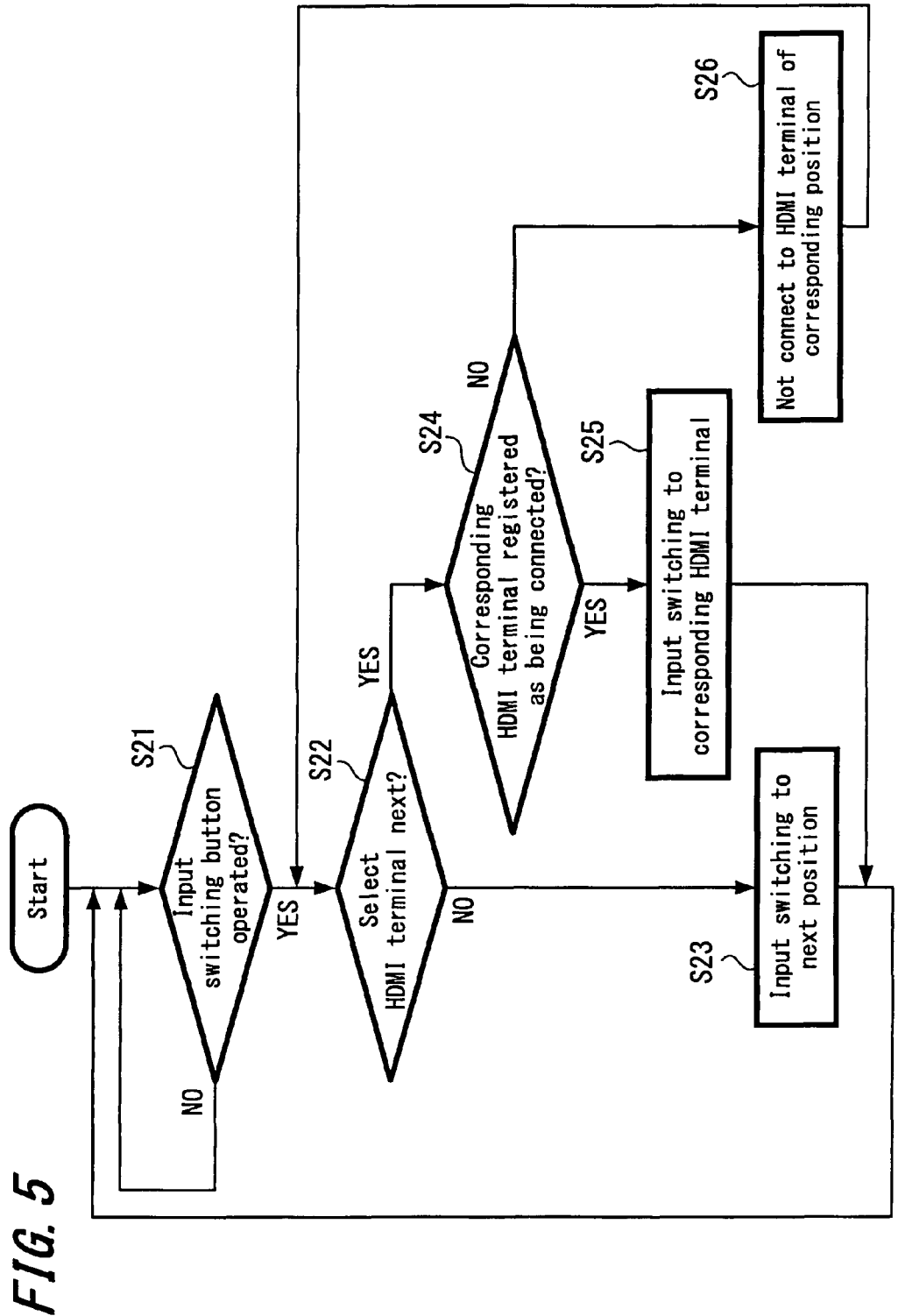
FIG. 5 is a flow chart indicating an example of processing when operating an input switching button according to an embodiment of the present invention.

A flow chart shown in FIG. 5 indicates an example of processing performed in the case where there is an operation of an input switching button provided as the key 124 (or, remote controller). Here, one button may be provided as the input switching button, which alternately selects the tuner of the television receiver 100 and the video input terminals each time the input switching button is depressed.

First, it is determined whether the input switching button is operated (step S21), and the processing stands by until the corresponding input operation. Subsequently, upon input of the corresponding operation, it is determined whether the HDMI terminal is next selected (step S22). In the case where it is determined that other terminals than the HDMI terminal, or the tuner is selected, the terminal or the tuner is selected to input data (step S23).

Subsequently, in the case where it is determined in step S22 that the HDMI terminal is selected, it is determined whether there is such registration that the video output device is connected to the corresponding HDMI terminal (step S24). In the case where it is determined that there is the device connected to the corresponding HDMI terminal, the corresponding HDMI terminal is selected to input video data, and the video data input to the HDMI terminal is output (step S25).

Further, in the case where it is determined at step S24 that there is no device connected to the corresponding HDMI terminal, the HDMI terminal of the corresponding position is not selected (step S26) and the processing is returned to step S22 to determine the next position selected.

The input switching is performed as described above. Accordingly, an HDMI terminal having no device connected thereto is skipped without being selected, when the input switching operation is performed, and as a result, operability is improved. Further, the decoding of the received data in the digital video decoder 112 is not required to determine the connection, and therefore whether there is the connection to the terminal can be determined easily and quickly. Further, even in the case where two HDMI terminals are provided as described in this embodiment, there is no need to provide the decoder for each terminal, but the decoder 112 can be shared with the two terminals, so that the circuit configuration can be simplified accordingly.

Further, operation of the digital video decoder 112 is terminated in the case where no device is connected to any of HDMI terminals. Accordingly, control on the digital video decoder 112 to operate only in the case of having a connected device is possible, and a redundant operation of the device can be eliminated so that power consumption can be reduced accordingly.

It should be noted that the connection state is detected and registered in the memory 123 in advance according to the above-described embodiment. However, it is possible that such connection state is not registered in advance, but the output voltage of the voltage detector 121 may be detected whenever there is the input switching operation, so that whether the terminal should be skipped is determined based on the detection of the voltage at that time.

Furthermore, according to the above-described embodiment, one input switching button is provided and all the inputs are switched in turn using this button, but a button used for the switching between HDMI terminals and a button used for the switching between the analogue video inputs may be provided separately, for example. If a switching button dedicated to HDMI terminals is provided and the button is operated in a state of a device being connected to one of two HDMI terminals, the HDMI terminal having the connected device is selected at any time. When the switching button dedicated to the HDMI terminals is operated in a state of no device being connected to any of the HDMI terminals, an input state is not changed from the state immediately before the operation, for example. A warning instruction such as "device is not connected to HDMI terminal" may be displayed at that time.

It should be noted that the above-described embodiment is applied to an interface of the HDMI standard, but an embodiment of the present invention can also be applied to other terminals of similar transmission standards as long as the terminals are configured to supply DC voltage between the terminals.

It should be understood by those skilled in the art that various modifications, combinations, sub-combinations and alterations may occur depending on design requirements and other factors insofar as they are within the scope of the appended claims or the equivalents thereof.

The invention claimed is:

1. A video receiving apparatus that comprises one or more video input terminals to input video data, the video receiving apparatus comprising:
   a voltage detector configured to detect a voltage applied to a specific contact point in each of the one or more video input terminals;
   a control unit configured to determine whether a video transmission apparatus is connected to each of the one or more video input terminals, based on a value of the voltage detected by the voltage detector; and
   a memory unit connected to the control unit and configured to store information of the video transmission apparatus connected to each of the one or more video input terminals,
   wherein a connection state of the video transmission apparatus connected to each of the one or more video input terminals is stored in the memory unit, and
   wherein the control unit is configured to perform a video input switching operation, in which said video input switching operation comprises:
   determining whether a currently selected video input terminal of the one or more video input terminals conforms to a High Definition Multimedia Interface (HDMI) standard;
   based on determining that the selected video input terminal conforms to the HDMI standard, determining whether a respective video transmission apparatus is connected thereto based on the connection state;
   based on determining that the respective video transmission apparatus is not connected thereto, causing the respective video input terminal not to be selected and causing a switch to another video input terminal, such that a HDMI input terminal not having a video transmission apparatus connected thereto is skipped without being selected when the input switching operation is performed.

2. The video receiving apparatus according to claim 1, wherein the one or more video input terminals are provided as HDMI video input terminals, and the voltage detector individually detects a voltage of the specific contact point in the HDMI video input terminals and determines whether a video transmission apparatus is connected to each of the HDMI video input terminals.

3. The video receiving apparatus according to claim 1, further comprising a decoder unit configured to decode the video data input to the one or more video input terminals to obtain decoded video data and to output the decoded video data such that video information corresponding thereto is supplied to the display,
   wherein the control unit controls the decoding unit not to operate, based on determining that there is no video transmission apparatus connected to the one or more video input terminals.

4. The video receiving apparatus according to claim 1, wherein the one or more video input terminals conforms to the HDMI standard.

5. The video receiving apparatus according to claim 1, further comprising a plurality of non-HDMI video input terminals which do not conform to the HDMI standard.

6. The video receiving apparatus according to claim 1, wherein the connection state of the video transmission apparatus is determined based on the value of the detected voltage and a predetermined threshold value of the voltage.

7. A method of receiving video using a television device that comprises a display and one or more video input terminals to input video data, comprising:
   detecting a voltage applied to a specific contact point in each of the one or more video input terminals;
   determining whether a video transmission apparatus is connected to each of the one or more video input terminals, based on a value of the detected voltage;
   storing in a memory unit connected to the control unit, information of the video transmission apparatus connected to each of the one or more video input terminals,
   wherein a connection state of the video transmission apparatus connected to each of the one or more video input terminals is stored in the memory unit; and
   performing a video input switching operation, comprising:
   determining whether a currently selected video input terminal of the one or more video input terminals conforms to a High Definition Multimedia Interface (HDMI) standard;
   based on determining that the selected video input terminal conforms to the HDMI standard, determining whether a respective video transmission apparatus is connected thereto based on the connection state;
   based on determining that the respective video transmission apparatus is not connected thereto, causing the respective video input terminal not to be selected and causing a switch to another video input terminal, such that a HDMI input terminal not having a video transmission apparatus connected thereto is skipped without being selected when the input switching operation is performed.

* * * * *